United States Patent [19]
Ajiki

[11] Patent Number: 5,973,881
[45] Date of Patent: Oct. 26, 1999

[54] MAGNETIC HEAD SLIDER WITH RAIL GROOVES NARROWING FROM BASE THEREOF

[75] Inventor: Ken Ajiki, Tokyo, Japan

[73] Assignee: NEC Corporation, Tokyo, Japan

[21] Appl. No.: 09/041,298

[22] Filed: Mar. 12, 1998

[30] Foreign Application Priority Data

Mar. 14, 1997 [JP] Japan .................................. 9-060934

[51] Int. Cl.⁶ .................................................. G11B 5/60
[52] U.S. Cl. .................................................. 360/103
[58] Field of Search .................................. 360/103, 122

[56] References Cited

U.S. PATENT DOCUMENTS

| | | | |
|---|---|---|---|
| 4,553,184 | 11/1985 | Ogishima | 360/103 |
| 4,802,042 | 1/1989 | Strom | 360/103 |
| 5,086,360 | 2/1992 | Smith et al. | 360/103 |
| 5,097,370 | 3/1992 | Hsia | 360/103 |
| 5,309,303 | 5/1994 | Hsia et al. | 360/103 |
| 5,793,568 | 8/1998 | Smith | 360/103 |

FOREIGN PATENT DOCUMENTS

| | | |
|---|---|---|
| 63-298879 | 12/1988 | Japan . |
| 3-063978 | 3/1991 | Japan ........ 360/103 |
| 4-069875 | 3/1992 | Japan . |
| 4-67485 | 3/1992 | Japan . |
| 4-117680 | 4/1992 | Japan . |
| 4-18847 | 7/1992 | Japan . |
| 4-228157 | 8/1992 | Japan . |
| 5-128468 | 5/1993 | Japan . |
| 6-44719 | 2/1994 | Japan . |
| 6-52646 | 2/1994 | Japan . |
| 6-208772 | 7/1994 | Japan . |

*Primary Examiner*—Craig A. Renner
*Attorney, Agent, or Firm*—Whitham, Curtis & Whitham

[57] ABSTRACT

An air bearing magnetic head slider includes a slider body carrying a preselected write/read device thereon. A preselected air stream flows in the vicinity of one major surface of the slider body during operation. At least a pair of side rails are formed on the major surface of the slider body and extend along the air stream. A cross rail connects the air inlet ends of the side rails. The side rails each is formed with preselected grooves each of which is delimited by the bottom wall substantially parallel to the major surface of the slider body and side walls connecting the bottom wall and the surface of the side rail. The bottom wall and each side wall are inclined by an angle of less than 90 degrees relative to each other.

6 Claims, 6 Drawing Sheets

| INCLINATION (DEGREE) | CRASHES/TESTS | |
|---|---|---|
| | SEEK TEST | DRAG TEST |
| 140 | 4/5 | 3/3 |
| 120 | 4/5 | 4/5 |
| 100 | 2/5 | 1/5 |
| 90 | 1/5 | 2/10 |
| 80 | 0/8 | 0/10 |
| 70 | 1/20 | 0/15 |
| 65 | 0/15 | 0/15 |
| 60 | 0/20 | 0/15 |

FIG.9

| GROOVE DEPTH ($\mu m$) | CRASH RATIO (%) | |
|---|---|---|
| | SEEK TEST | DRAG TEST |
| 0 | 20 | 60 |
| 3 | 0 | 20 |
| 5 | 0 | 0 |
| 10 | 0 | 0 |
| 30 | 0 | 0 |
| 50 | 0 | 0 |
| 60 | 40 | 20 |
| 70 | 80 | 33 |

FIG.10

| GROOVE WIDTH (μm) | CRASH RATIO (%) ||
|---|---|---|
| | SEEK TEST | DRAG TEST |
| 0 | 20 | 75 |
| 5 | 20 | 50 |
| 10 | 0 | 0 |
| 20 | 0 | 0 |
| 50 | 0 | 0 |
| 100 | 0 | 0 |
| 200 | 0 | 0 |
| 250 | 30 | 0 |
| 300 | 30 | 0 |
| 400 | 70 | 10 |

FIG.11

| GROOVE ANGLE (DEGREE) | CRASH RATIO (%) ||
|---|---|---|
| | SEEK TEST | DRAG TEST |
| 10 | 0 | 0 |
| 30 | 0 | 0 |
| 45 | 0 | 0 |
| 60 | 0 | 0 |
| 75 | 33 | 10 |

FIG.12

MAGNETIC HEAD SLIDER WITH RAIL GROOVES NARROWING FROM BASE THEREOF

BACKGROUND OF THE INVENTION

The present invention relates to a magnetic head slider and, more particularly, to a so-called negative pressure type head slider for use in a magnetic disk drive.

To meet the increasing demand for a magnetic disk drive with a high density recording capability, attempts have been made to reduce a gap between a magnetic head and a recording medium. As for the mechanical reliability of the disk drive itself, the key is the configuration of the interface between a magnetic head slider and a magnetic disk, as keenly discussed today.

When a magnetic head slider and a magnetic disk contact and slide on each other, dust or powder is produced at an air bearing surface (ABS) between the slider and the disk. The dust is one of factors that degrade the mechanical reliability of the disk drive. The decreasing gap between the head and the disk, i.e., the decreasing amount of light of the head slider increases the chance of contact of the head slider and disk not only at the time of contact start and stop (CSS) but also at the time of track access and usual flight. In this respect, the dust problem is becoming more critical.

Specifically, when the dust deposits on the ABS and side walls of the head slider, it varies the flying characteristic of the head slider and brings about a head crash. Moreover, the dust deposited on a write/read device results in defective recording and reproduction. In addition, the dust caught between the head slider and the disk is apt to scratch the disk or the slider or is apt to cause the slider and disk to adhere to each other to thereby practically disable the disk drive.

Japanese Patent Laid-Open Publication No. 4-117680 (Document 1 hereinafter) teaches a magnetic head slider so configured as not to catch the dust between it and a magnetic disk or stick or the disk when a magnetic disk drive is out of operation. This head slider includes side rails formed with obliquely extending grooves by machining. Japanese Patent Laid-Open Publication No. 4-67485 (Document 2 hereinafter) discloses a magnetic head slider including side rails formed with a number of straight grooves in an ABS surface thereof by lapping. Further, Japanese Patent Laid-Open Publication No. 6-208772 (Document 3) proposes a magnetic head slider formed with grooves perpendicular to the direction of an air stream in its tapered or chamfered surface which is located at the air inlet end of the slider. With the grooves formed in the tapered surface, the head slider discharges the previously mentioned dust, as well as dust introduced from the outside, in order to obviate head crashes.

The above conventional head sliders each has some problems left unsolved, as follows. The head sliders taught in Document 1 and 2 cause the dust to deposition the side walls of the grooves formed in the side rails. The angle between the side walls and the bottom wall of each groove is generally greater than 90 degrees inclusive although it depends on the machining method. As the above angle increases, the dust deposits on the side walls more easily and aggravates the probability of head crash. This is because the dust on the side walls appears on the ABS and deteriorates the flying characteristic of the head slider, and because the dust forming a mass is easily caught between the slider and the disk.

The head slider proposed in Document 3 is not desirable as a low flight type head slider adapted for high density recording. Specifically, the head slider introduces dust produced from a magnetic disk into the grooves of the tapered portion and causes it to drop onto the disk in the form of amass of suitable size. Such a mass is a critical cause of head crash because a head slider for used in an advanced magnetic head drive flies only about 0.1 μm or less.

Further, the head slider of Document 3 is not desirable as a low flying height, negative pressure type head slider. Specifically, a low flying height head slider is processed by ion milling or similar method more accurate than tapering, chamfering or similar machining customarily applied to head sliders.

As stated above, the conventional head sliders each lacks means for sufficiently coping with head crashes ascribable to the dust derived from the contact of the slider and a magnetic disk.

Technologies relating to the present invention are also taught in, e.g., Japanese Patent Laid-Open Publication Nos. 63-298879, 4-188479, 4-228157, 5-128468, 6-44719, and 6-52646.

SUMMARY OF THE INVENTION

It is therefore an object of the present invention to provide a reliable magnetic head slider capable of protecting a magnetic disk drive from troubles ascribable to dust.

A magnetic head slider of the present invention includes a slider body carrying a preselected write/read device thereon. A preselected air stream flows in the vicinity of one major surface of the slider body during operation. At least a pair of side rails are formed on the major surface of the slider body and extend along the air stream. A cross rail connects the air inlet ends of the side rails. The side rails each is formed with preselected grooves each of which id delimited by a bottom wall substantially parallel to the major surface of the slider body and side walls connecting the bottom wall and the surface of the side rail. The bottom wall and each side wall are inclined by an angle of less than 90 degrees relative to each other. The head slider protects a magnetic disk drive from troubles ascribable to dust.

BRIEF DESCRIPTION OF THE DRAWINGS

The above and other objects, features and advantages of the present invention will become apparent from the following detailed description taken with the accompanying drawings in which:

FIG. 9 is a table showing how a head crash ratio varies in accordance with an angle between the bottom and the side walls of the groove;

FIG. 10 is a table showing how a head crash ratio varies in accordance with the depth of the groove;

FIG. 11 is a table showing how a head crash ratio varies in accordance with the width of the groove; and FIG. 12 is a table showing how the head crash ratio varies in accordance with the angle between the groove and the longitudinal direction of a side rail.

DESCRIPTION OF THE PREFERRED EMBODIMENT

Figure 1A:
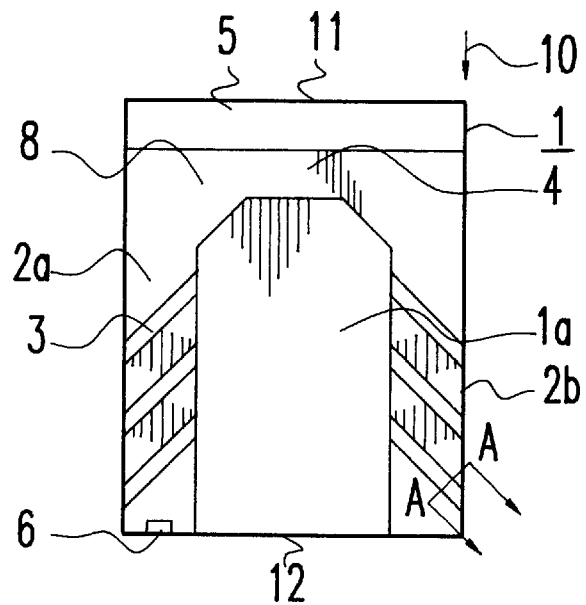
FIG. 1A is a plan view of a magnetic head slider embodying the present invention, as viewed from a side rail side.
Figure 1B:
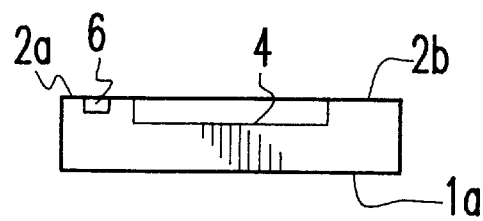
FIG. 1B is a side elevation of the illustrative embodiment, as viewed from an air inlet side.

Referring to FIGS. 1A and 1B of the drawings, a magnetic head slider embodying the present invention is shown and includes a slider body 1a. The slider body 1a carries a preselected write/read device 6 thereon. During operation, a preselected air stream 10 flows into and then out of the slider body 1a along one of opposite major surfaces of the body 1a. At least a pair of side rails 2a and 2b and a cross rail 4 are formed on the major surface of the slider body 1a. The side rails 2a and 2b extend in the direction in which the air stream 10 flows, while the cross rail 4 connects the air inlet ends 11 of the side rails 2a and 2b. The side rails 2a and 2b each is formed with grooves 3 at preselected positions thereof. Each groove 3 is delimited by a bottom wall substantially parallel to the major surface of the slider body 1a and side walls extending between the bottom wall and the surface of the associated side rail 2a or 2b, as will be described specifically later. The bottom wall and each side wall make an angle of less than 90 degrees therebetween.

Specifically, the slider body 1a is formed of, e.g., Si and implemented as a substantially rectangular plate, as seen in a plan view, having a preselected thickness. The sides of the slider body 1a extending in the direction of the air stream 10 are longer than the other sides. Alternatively, the slider body 1a may have a square configuration or an oblong configuration extending perpendicularly to the direction of the air stream 10.

The side rails 2a and 2b play the role of an ABS facing a magnetic disk or recording medium not shown. In the illustrative embodiment, the side rails 2a and 2b are respectively positioned at the left and right ends of the slider body 1a, as seen in FIG. 1A. If desired, the side rails 2a and 2b may be positioned slightly inward of the opposite ends of the slider body 1a. While the side rails 2a and 2b are shown as extending in parallel to the air stream 10, they may be slightly inclined relative to the direction of the air stream 10. The side rails 2a and 2b and cross rail 4 connecting them form a generally U-shaped projection in combination.

Figure 2:
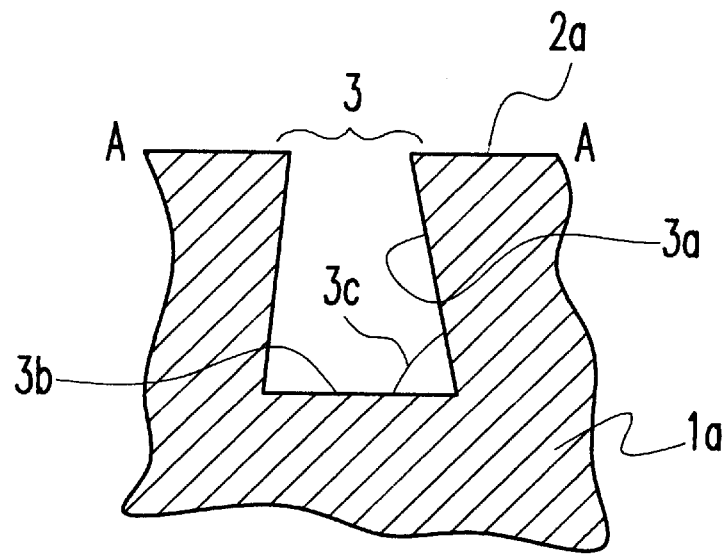
FIG. 2 is a section showing one of grooves included in the illustrative embodiment.

The grooves 3 formed in the side rails 2a and 2b each is inclined from the air inlet end 11 toward an air outlet end 12 away from the center of the slider body 1a. As shown in FIG. 2 which is a section along line A—A of FIG. 1A, each groove 3 has side walls 3a and a bottom wall 3b. Each side wall 3a is inclined relative to the bottom wall 3b at an angle 3c of less than 90 degrees, so that the groove 3 has a generally trapezoidal configuration. While the groove 3 is shown as being symmetrical in the right-and-left direction in FIG. 2, it may be asymmetrical, if desired.

Figure 3:
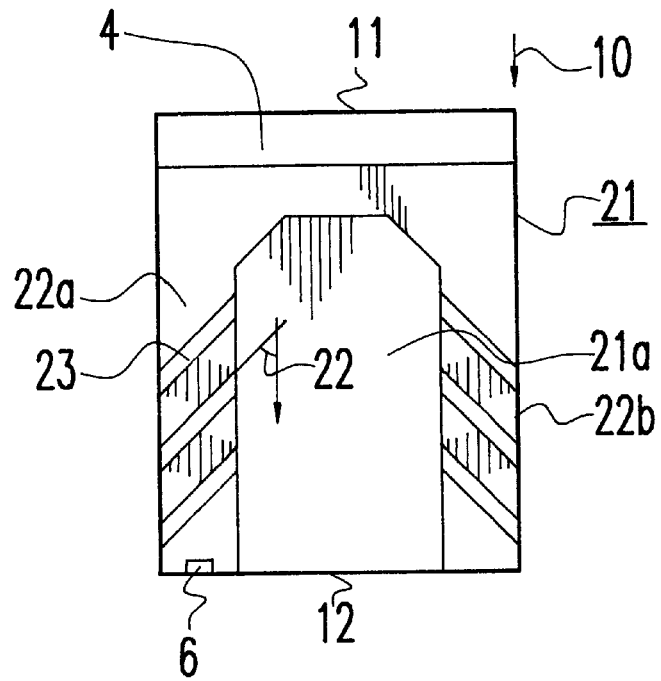
FIGS. 3–7 each shows a particular modification of the illustrative embodiment.

Some modifications of the above embodiment will be described with reference to FIGS. 3–7. First, as shown in FIG. 3, the imaginary extension of each groove 23 should preferably be inclined at an angle 22 of greater than 10 degrees inclusive, but smaller than 60 degrees inclusive, relative to the lengthwise direction of an associated side rail 22a or 22b. If the angle 22 is smaller than 10 degrees or greater than 60 degrees, a dust discharging effect available with the grooves 3 is degraded during operation of a magnetic disk drive, i.e., when the air stream 10 has a yaw angle relative to the head slider. Specifically, when a head slider 21 shown in FIG. 3 seeks a recording medium, not shown, it moves in the radial direction of the disk. At this instant, a difference in angle occurs between the air stream 10 ascribable to the seek and the longitudinal direction of the head slider 21 because the head slider 21 is supported by a head support arm not shown. That is, the air stream 10 flows slightly obliquely relative to the longitudinal direction of the head slider 21. The yaw angle refers to such an angle between the air stream 10 and the head slider 21.

The optimal width and depth and the optimal number of grooves 23 depend on the size of the head slider 21 and the configuration of the side rails or ABS 22a and 22b. The minimum width of each groove 23 should preferably be 10 μm. The depth of each groove, as measured from the bottom wall to the surface of the side rail 21, should preferably be less than 50 nm inclusive. Widths and depths outside the above ranges would degrade the dust discharging effect and would make it difficult to maintain the uniform flying characteristic of the head slider 21.

The number of grooves 23 is dependent also on the width of each groove 23 and not limited. However, the total area of the open ends of the grooves 23 should preferably be less than ⅗, inclusive, of the total area of the side rails 22a and 22b and cross rail 4. Should the total area of the grooves 23 be excessively great, the positive pressure to act between the disk and the ABS would be reduced and would noticeably reduce the amount of flight of the head slider 21 with respect to the disk.

Figure 4:
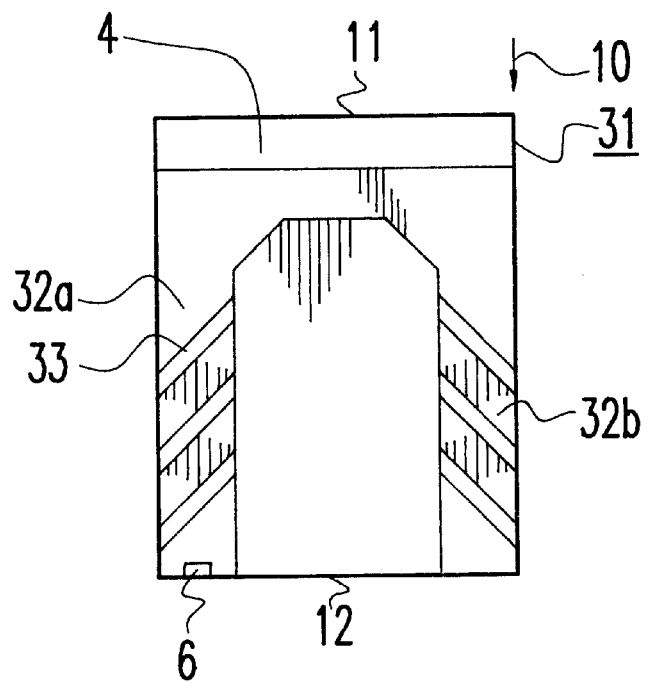
Figure 5:
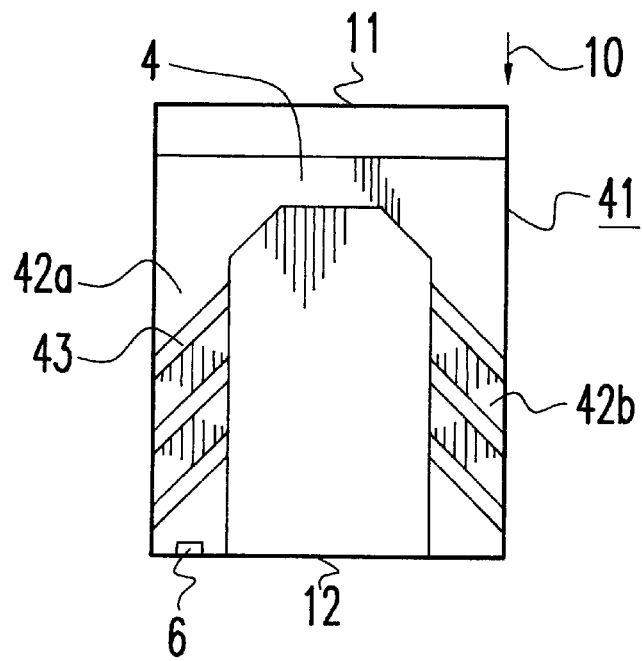
Figure 6:
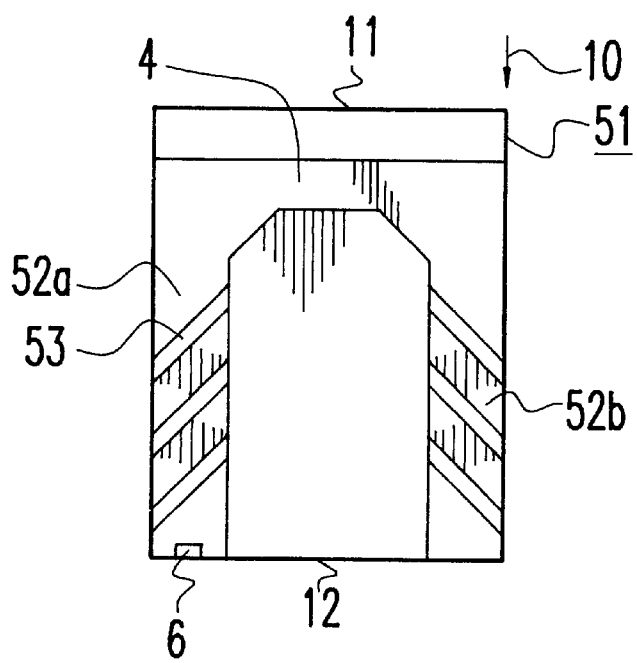

As shown in FIG. 4, each groove 33 may be flared outward away from the center of a head slider 31. Further, as shown in FIG. 5, grooves 43 formed in side rails 42a and 42b each may have a particular configuration. FIG. 6 shows a specific asymmetrical arrangement of grooves 53 formed in side rails 52a and 52b. As shown, the grooves 53 formed in the side rail 52a and the grooves formed in the side rail 52b are inclined in the same direction at the same angle relative to the longitudinal direction of the side rails 52a and 52b.

Figure 7:
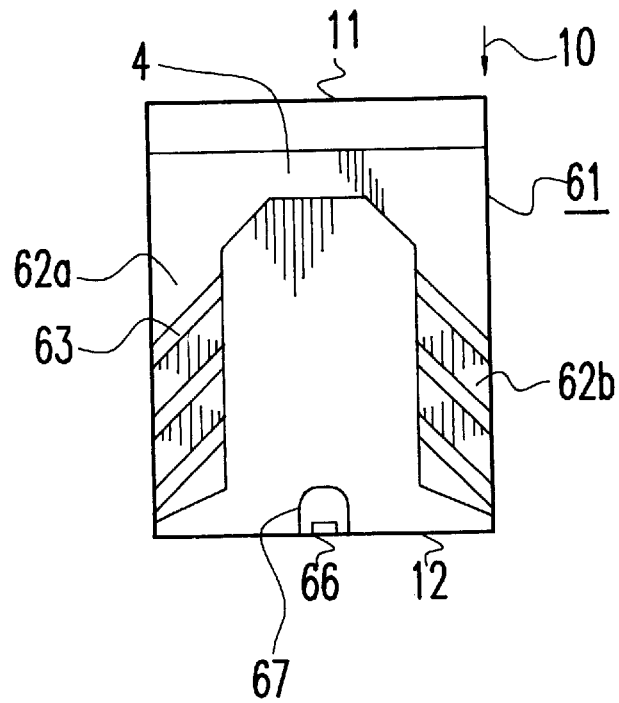

In FIGS. 1A and 1B, the write/read device 6 is mounted on the air outlet end 12 of the side rail 2b. Another write/read device 6 may be mounted on the other side rail 2a, if desired. Further, as shown in FIG. 7, a center pad 67 loaded with a write/read device 66 may be positioned at substantially the center of the air outlet end 12 of a head slider 61.

In any case, the head slider should preferably be formed of Si. Although the material of the head slider is open to choice so long as it can be processed in a desired configuration, Si is feasible for fine processing as to the ABS and grooves. If desired, Si may be replaced with $Al_2O_3$.TiC, $CaTi_O3$, SiC or SiN. These alternative substances generally applied to magnetic head sliders are mechanically durable and easy to process, allowing desired processing conditions to be relatively easily selected.

The operation of the head slider 1 shown in FIGS. 1A and 1B will be described hereinafter. While the magnetic disk drive, not shown, is in operation, dust is entrained by the air stream 10 flowing into the inlet end 11 toward the outlet end 12 between the head slider 1 and a magnetic disk not shown. A major part of the dust is introduced into the grooves 3 and then discharged to the outside of the head slider 1 along the grooves 3. Although some dust may deposit on the side walls 3a of the grooves 3, it is received in the recessed corner portions between the side walls 3a and the bottom walls 3b.

As stated above, dust entrained by the air stream 10 to a gap between the head slider 1 and the disk is discharged from the slider 1 without being caught in the gap. This successfully obviates head crashes and adhesion of the head slider 1 to the disk, thereby enhancing the reliability of the disk drive.

Even when dust deposits on the walls of the grooves 3, it does not appear on the ABS due to the trapezoidal configuration of the grooves 3. Therefore, the flying characteristic of the head slider can be maintained stable over a long period of time. In addition, the write/read device 6 is capable of surely performing its operation because it is free from dust. This also enhances the reliable operation of the disk drive.

Figure 8:
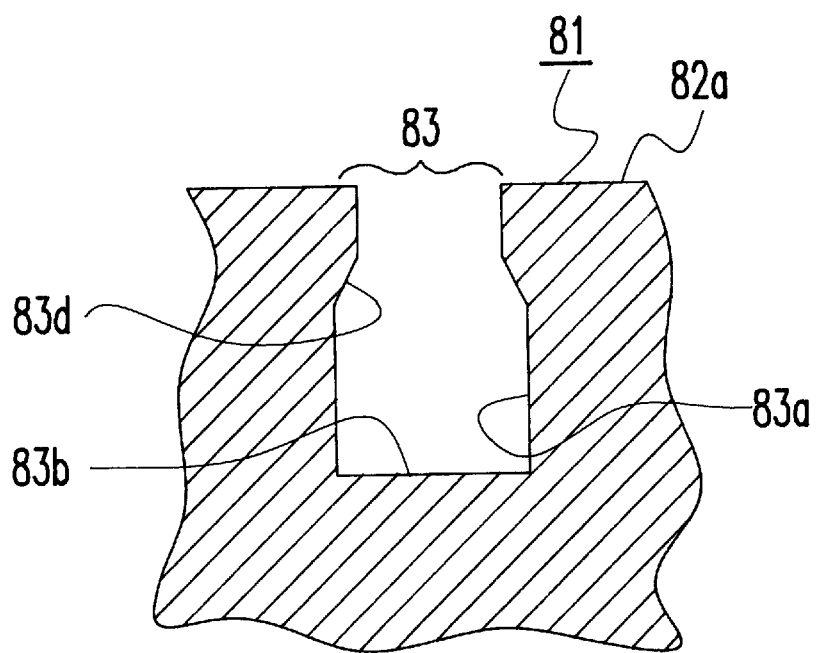
FIG. 8 is a section showing an alternative embodiment of the present invention.

Referring to FIG. 8, an alternative embodiment of the present invention will be described. As shown, a head slider 81 is formed with grooves 83 (only one is shown). Each groove 83 has side walls 83a having a stepped configuration as distinguished from the inclined configuration. With the stepped configuration, it is also possible to discharge the dust from the head slider 81 and prevent the dust deposited on the side walls 83a in the form of a mass from appearing on the ABS.

Specifically, the side walls 83a and a bottom wall 83b of the groove 83 are substantially perpendicular to each other in the vicinity of the bottom wall 83b. On the other hand, the direction in which a part of each side wall is extended is inclined at an angle of less than 90 degrees relative to the bottom wall 83b. More specifically, in the illustrative embodiment, each side wall 83b has a slant 83d in its intermediate portion. The slant 83d merges into a top portion terminating at the surface of a side wall 82a and inclined at an angle slightly smaller than 90 degrees relative to the bottom wall 83b. Even if dust deposits on the such side walls 83a, it does not appear on the ABS surface in the form of a mass.

Magnetic disk drives loaded with samples of the head slider in accordance with the present invention were subjected to mechanical durability tests. The results of the tests will be described with reference to FIGS. 9–12. The samples each included an Si substrate and had its ABS and chamfer step (air inlet end) formed by ion milling using Ar gas. Ion milling was effected with an Ar gas pressure of 0.2 mTorr, an acceleration voltage of 500 V, and a current density of 0.6 mA/cm$^2$.

Grooves were formed in each head slider by reactive ion etching using $CF_4$ and $O_2$ as a reactive gas and an additive gas, respectively, and a high frequency power of 100 W, a power density of 1.3 W/cm$^2$, and a gas pressure of 0.02 Torr. The angle between the bottom wall and the side walls of each groove was varied by varying the gas partial pressure and etching time.

FIG. 9 shows a case wherein the grooves had a fixed depth of 30 nm and a fixed width of 100 μm while the angle between the bottom and the side walls was varied. The frequency of head crash was determined with a seek test repeated for 72 hours over all of the tracks of a recording medium, and a contact slide test continued with the same track for 24 hours under a reduced pressure of 0.2 Torr.

As FIG. 9 indicates, when the angle between the bottom wall and the side walls is greater than 90 degrees inclusive, dust derived from the contact of the head slider and recording medium during seek test or drag test deposited on the side walls and appeared on the ABS, resulting in a head crash. This was particularly true with the contact slide test continued over a long period of time. By contrast, when the above angle is smaller than 90 degrees, hardly any head crash occurred in both of the seek test and drag test. Further, when the angle was less than 90 degrees, the write/read characteristic was not deteriorated even after the durability tests. This is derived from the fact that dust is successfully discharged to the outside of the slider or adequately received in the recessed portions of the side walls due to the unique configuration of the grooves, i.e., the dust does not deposit on the write/read device.

FIG. 10 shows a case wherein the depth of the grooves was varied. The angle between the slide walls and the bottom was fixed at 80 degrees while the width of the grooves was fixed at 100 μm. As shown, when the grooves were shallow, the volume of each groove was too small to promote the discharge of dust, resulting in head crashes. When the depth of each groove was greater than 50 nm, the flying height of the head slider with respect to the recording medium and the uniformness of the flying height were reduced, lowering durability to a noticable degree. When the depth was between 10 nm and 50 nm, no head crashes occurred, i.e., the durability of the disk drive was improved.

FIG. 11 shows a case wherein the angle between the bottom wall and the side walls of the grooves and the depth of the grooves were respectively fixed at 90 degrees and 30 nm, but the width of the grooves was varied. As shown, when the grooves were narrow, they deteriorated the flow of dust therein and caused it to deposit on the side walls in the vicinity of the surface of the side rails. As a result, durability was deteriorated particularly in the drag tests. When the width of the grooves was excessively great, the flying height of the head slider was reduced. This is because the grooves formed in the side rails reduce the positive pressure acting between the ABS of the side rails and the recording medium. As a result of the reduced flying height, the head slider intensely contacted the recording medium and degraded durability during seek.

As shown in FIG. 11, durability was improved when the width of the grooves was between 10 μm and 200 μm. The maximum width of the grooves depends on the overall size of the head slider and the number of grooves. The head sliders subjected to the durability tests each had a longitudinal dimension of about 1.3 mm, a lateral dimension of 1.0 mm, and a thickness of 0.3 mm. Three grooves were formed in each of opposite side rails. Under these conditions, when the width exceeds 200 μm, the total area of the open ends of the grooves is greater than about 60%, inclusive, of the total area of the side rails and cross rail, as measured on one major surface of the head slider. This indicates that to realize desirable mechanical durability, the maximum width of each groove should be so selected as to make the total area of the grooves less than 60% of the total area of the side rails and cross rail.

CSS tests were also performed with the head sliders subjected to the above mechanical durability tests. A desirable CSS characteristic was achieved when the width of each groove was less than 400 μm inclusive. The desirable CSS characteristic refers to the fact that the head slider does not stick to the recording medium.

CSS characteristics were compared with respect to the presence/absence of the grooves. When the grooves were absent, i.e., when the width of the grooves was 0 μm, the dynamic and static coefficients of friction respectively increased by 34% and 60% after the test. By contrast, when the grooves were present, the dynamic and static coefficients of friction did not increase by more than 22% and 37% respectively. With the present invention, therefore, it is possible to reduce friction between the head slider and the recording medium and thereby prevent the former from sticking to the latter.

FIG. 12 shows the results of mechanical durability tests conducted with magnetic head sliders each having the configuration of FIG. 3. For the tests, the inclination of the grooves relative to the longitudinal direction of the side rails was varied. Specifically, each groove had a bottom and side walls inclined at 80 degrees relative to each other, a depth of 30 nm, and a width of 100 μm. As FIG. 12 indicates, when the grooves were inclined by more than 60 degrees relative to the longitudinal direction of the side rails, head crashes occurred in both of the seek tests and drag tests. This is presumably because when the head slider moves in the radial direction of the recording medium, dust cannot be sufficiently discharged due to the previously mentioned yaw angle of the air stream. The mechanical durability is therefore improved when the angle of the grooves relative to the longitudinal direction of the side rails is less than 60 degrees.

Further, the present invention was applied to head sliders including substrates formed of $Al_2O_3TiC$. These head sliders had ABSs and chamfer steps formed by Ar ion milling under the same conditions as in the first-described embodiment. The grooves were formed by induction heating coupling type plasma etching using $CF_4$ as reaction gas. While some of the head sliders had 40 nm deep, 200 μm wide grooves whose bottoms and side walls were inclined by 85 degrees relative to each other, the other head sliders did not have any groove. The two kinds of head sliders were identical as to ABS configuration. Durability tests showed that the head sliders with the grooves caused no head crashes to occur in both of the seek tests and drag tests. The head sliders without the grooves brought about a head crash ratio of about 10% in the seek tests and a head crash ratio of about 33% in the drag tests. It will therefore be seen that the grooves increase the mechanical durability even when the head sliders are formed of $Al_2O_3TiC$. This is also true with head sliders formed of SiC, SiN, $CaTiO_3$, ferrite, or $ZrO_2$.

The specific head sliders described above were subjected to 100,000 times of CSS tests and found to achieve a desirable CSS characteristic. In addition, the write/read characteristic of write/read devices was not deteriorated even after the above mechanical durability tests.

In the illustrative embodiments, the grooves are formed by either reactive ion etching using $CF_4$ and $O_2$ as reaction gas or induction heating coupling type plasma etching using $CF_4$. If desired, the reactive gas may be implemented by $CCl_2F_2$, $C_2F_6$, $NF_3$, $SF_6$ or $CBrF_3$ while the additive gas may be implemented by $H_2$, $C_2H_6$, $Cl_2$, Cl or a mixture thereof. Further, to form the grooves, use may be made of a reactive ion beam, laser-assisted etching, ECR plasma etching, helicon wave plasma etching, or wet etching.

Of course, any suitable number of grooves other than three grooves shown and described may be formed in each of the side rails. The advantages described above are achievable without regard to the presence/absence of a protection layer on the ABS of the head slider or to the overall size of the head slider.

In summary, it will be seen that the present invention provides a magnetic head slider having various unprecedented advantages enumerated below.

(1) Opposite side rails each is formed with preselected grooves each having side walls and a bottom wall inclined by less than 90 degrees relative to each other. In this configuration, dust derived from the contact of the head slider and a recording medium and entered a gap between the slider and the medium can be discharged to the outside of the slider via the grooves. This effectively prevents the mechanical durability of a magnetic disk drive from being lowered due to the influence of the dust.

(2) The grooves reduce the area of the head slider to contact the recording medium and therefore friction to act between them, thereby preventing the slider from sticking to the medium.

(3) Even when the dust deposits on the side walls of the grooves, it is successfully received in the recessed portions of the grooves and does not appear on the ABS.

(4) The grooves are inclined at a preselected angle relative to the longitudinal direction of the side rails, so that the dust can be efficiently and smoothly discharged from the grooves to the outside of the head slider.

(5) Because the minimum width of each groove is greater than 10 μm inclusive, the dust can be surely introduced into the grooves and then discharged to the outside of the head slider.

(6) Because each groove has a depth lying in a preselected range, the volume of the groove is great enough to discharge the dust. In addition, an adequate positive pressure acts between the head slider and the recording medium, allowing the slider to fly by a uniform amount relative to the medium.

(7) The open ends of the grooves have a total area less than 3/5, inclusive, of the total area of the side rails and a cross rail. With this configuration, the above advantage (6) is also achievable.

(8) The head slider is formed of Si or similar substance and therefore low cost and desirable in performance and strength.

What is claimed is:

1. A magnetic head slider comprising:

a slider body carrying a preselected write/read device thereon and causing a preselected air stream to flow in the vicinity of one major surface thereof during operation;

at least a pair of side rails formed on said one major surface of said slider body and extending along the air stream; and a cross rail connecting air inlet ends of said pair of side rails;

said pair of side rails each being formed with preselected grooves each being delimited by a bottom wall substantially parallel to said one major surface of said slider body and side walls each connecting said bottom wall with a surface of the side rail, wherein each of said side walls are inclined by an angle of less than 90 degrees relative to said bottom wall.

2. A magnetic head slider as claimed in claim 1, wherein said grooves are inclined by an angle of 10 degrees to 60 degrees relative to a longitudinal direction of said side rails.

3. A magnetic head slider as claimed in claim 1, wherein said grooves each has a minimum width of 10 μm.

4. A magnetic head slider as claimed in claim 1, wherein said grooves each has a depth of 5 nm to 50 nm, as measured from said bottom wall to the surface of the side rail.

5. A magnetic head slider as claimed in claim 1, wherein said grooves are open over a total area which is less than 3/5,inclusive, of the total area of said side rails and said cross rail.

6. A magnetic head slider as claimed in claim 1, wherein said slider body and said side rails are formed on one of Si, $Al_2O_3TiC$, SiC, SiN and $CaTiO_3$.

* * * * *